(12) United States Patent
Curry et al.

(10) Patent No.: US 7,392,289 B2
(45) Date of Patent: Jun. 24, 2008

(54) METHOD, SYSTEM, AND PROGRAM PRODUCT FOR AUTOMATICALLY FORMATTING ELECTRONIC MAIL ADDRESSED TO AN INTENDED RECIPIENT

(75) Inventors: James T. Curry, Miami, FL (US); Dinesh A. Shenoy, Del Mar, CA (US)

(73) Assignee: Estationer, LLC, Fort Lauderdale, FL (US)

( * ) Notice: Subject to any disclaimer, the term of this patent is extended or adjusted under 35 U.S.C. 154(b) by 970 days.

(21) Appl. No.: 10/632,137

(22) Filed: Aug. 1, 2003

(65) Prior Publication Data
US 2005/0027781 A1 Feb. 3, 2005

(51) Int. Cl.
G06F 15/16 (2006.01)
(52) U.S. Cl. .................... 709/206; 709/203
(58) Field of Classification Search .......... 709/203–206
See application file for complete search history.

(56) References Cited

U.S. PATENT DOCUMENTS

| | | | |
|---|---|---|---|
| 5,734,901 | A | 3/1998 | Sidhu et al. |
| 6,085,201 | A | 7/2000 | Tso |
| 6,101,320 | A | 8/2000 | Schuetze et al. |
| 6,141,695 | A * | 10/2000 | Sekiguchi et al. ......... 709/246 |
| 6,253,231 | B1 | 6/2001 | Fujii |
| 6,332,156 | B1 * | 12/2001 | Cho et al. ................. 709/206 |
| 6,438,584 | B1 | 8/2002 | Powers |
| 6,542,923 | B2 | 4/2003 | Nguyen |
| 6,549,612 | B2 | 4/2003 | Gifford et al. |
| 6,816,885 | B1 * | 11/2004 | Raghunandan ............. 709/206 |
| 7,051,075 | B1 * | 5/2006 | Machino et al. ........... 709/206 |
| 2001/0034769 | A1 | 10/2001 | Rast |
| 2002/0029250 | A1 | 3/2002 | Reiner |
| 2002/0059447 | A1 | 5/2002 | Nguyen |
| 2002/0078158 | A1 | 6/2002 | Brown et al. |
| 2002/0103858 | A1 | 8/2002 | Bracewell et al. |
| 2002/0131566 | A1 | 9/2002 | Stark et al. |
| 2002/0147847 | A1 | 10/2002 | Brewster et al. |
| 2002/0174185 | A1 | 11/2002 | Rawat et al. |
| 2002/0178190 | A1 | 11/2002 | Pope et al. |
| 2002/0178229 | A1 | 11/2002 | Sinha et al. |
| 2002/0194341 | A1 | 12/2002 | Gupta |
| 2002/0194379 | A1 | 12/2002 | Bennett et al. |
| 2003/0004986 | A1 | 1/2003 | Lin et al. |
| 2003/0020959 | A1 | 1/2003 | Henry |

(Continued)

OTHER PUBLICATIONS http://www.dmnews.com/Dilbert-Xoomcom-Sign-Viral-Marketing-Pact/article/62884, retrieved on Jan. 29, 2008.

*Primary Examiner*—Krisna Lim
(74) *Attorney, Agent, or Firm*—McDermott Will & Emery LLP; David Tennant

(57) ABSTRACT

The concepts discussed herein address a system, method, and computer product by which an e-mail is automatically formatted. An e-mail is sent by an e-mail client and received by a server for processing outbound and inbound e-mail including a SMTP server, POP3/IMAP server, or another server in communication with the SMTP server, POP3/IMAP server, or both. The server receives the e-mail message from the e-mail client and text-parses the received e-mail for identifying an e-mail attribute. Next, the system formats the received e-mail message in accordance with a predetermined format corresponding to the identified e-mail attribute, which is sent to intended recipient(s).

30 Claims, 6 Drawing Sheets

U.S. PATENT DOCUMENTS

2003/0182383 A1* 9/2003 He ............................. 709/206
2003/0191689 A1* 10/2003 Bosarge et al. ................ 705/14
2003/0200272 A1* 10/2003 Campise et al. ............ 709/206
2004/0186889 A1* 9/2004 Washburn ................... 709/206
2006/0015559 A1* 1/2006 Yabe et al. .................. 709/206

* cited by examiner

METHOD, SYSTEM, AND PROGRAM PRODUCT FOR AUTOMATICALLY FORMATTING ELECTRONIC MAIL ADDRESSED TO AN INTENDED RECIPIENT

FIELD OF THE INVENTION

The present invention relates to a system, method, and program product for automatically formatting electronic mail sent from an e-mail client and received by a gateway server for receiving and processing inbound e-mail or a gateway server for receiving and processing outbound e-mail.

BACKGROUND

A benefit of the internet and World Wide Web that has led to its popularity is the dynamic nature of the medium. New information can be updated and promoted quickly and easily to inform customers about a limited time sale or press release. E-mail correspondence is a new medium that corporations can take advantage of on a scheduled basis for emphasizing certain promotions or corporate benefits.

Corporate brand identity is an important part of a company's overall marketing strategy. A strong brand reflects on the performance and accomplishments of the brand's owner. To this end, marketing divisions within an organization centralize the production and quality control of business cards, letterhead, web-page design, collateral and signage. Consistency and uniformity are crucial in establishing a strong brand presence. In this regard, common business practice includes design guidelines and graphic kits to aid divisions or partners in communicating a brand's image effectively.

Electronic mail communication ("e-mail") has become a primary tool for inter-company communication. Employees often use electronic mail as the primary means of written communication to interact with customers, corporate partners, vendors, and investors.

Despite the importance of a brand identity to a company, companies are unable to effectively use their current e-mail infrastructure to send branded e-mail to recipients. There is no way to manage and control a corporate brand with current electronic mail technologies. This is a significant problem because it doesn't leverage the tremendous investment made in the company's brand or e-mail infrastructure and wastes numerous opportunities to advance this public-relations effort.

In computer network systems such as local-area networks ("LANs"), wide-area networks ("WANs"), and the internet and the world-wide web ("WWW"), electronic mail systems are often utilized to facilitate communication between two or more users of the network. Each user has a unique network address that may be used for routing and identifying purposes in delivering an e-mail message from one user (the "sender") to another user (the "recipient") on the network.

Often an e-mail message contains a relatively small amount of text or other forms of data. One or more additional files of data, called "attachments" are often attached to the e-mail message. For example, a word processing file or graphic file that is incompatible with the display capabilities of the e-mail system or that is too large to be conveniently displayed by the e-mail application program may be transmitted from the sender to the recipient by attaching it to an e-mail message. The e-mail message may introduce or explain the attachments. Thus, the recipient receives the e-mail message plus any attached data files, wherein the attached data files must be opened, accessed, or utilized separately from the e-mail message itself. In the alternative, an attachment to the e-mail may be viewed within the e-mail depending on the program used.

HTML formats have become the language of page compositions for web sites. Moreover, objects can be scanned into HTML formats for use in web pages. Composition and display of HTML formats has been added to most mainstream e-mail programs. However, a large time commitment is needed to design HTML e-mail formats with scanned inputs and graphical elements. Hence, this format has not been generally utilized for personal e-mail correspondence, as distinguished from bulk e-mail, due to the limited amount of time typically available for doing such tasks.

Many e-mail programs supply tools to use rich-text formatting (RTF) in electronic messages. This include bold, highlighting, and font colors. Early systems supported this capability only for internal systems or similar clients. As an example, Microsoft Outlook® messages would arrive correctly to other Outlook recipients but formatting would often be lost when viewed in other e-mail clients. This has led to many people not utilizing these features, unsure of how their formatted correspondence will be received.

Microsoft Outlook provides a stationery feature in its application that allows users to use a default template for correspondence. However, this feature is not activated for replies and forwards of existing electronic mail messages. Since a large percentage of correspondence involves replies and back-and-forth communication, many e-mail messages are sent without proper brand identity resulting in lost opportunities. Another limitation is updating the template on a regular basis. Templates are stored locally on each computer that makes managing and updating them a difficult task.

Lotus Notes e-mail client provides a stationery feature for users as a tool to use for form-based correspondence. This feature is not integrated in the "New Memo" features of this application, requiring a separate, additional step to use stationery. Additionally, Notes has the same limitation as Microsoft Outlook in that it does not incorporate replies in its capabilities.

U.S. Pat. No. 6,446,115 shows correspondence services through its web site to deliver branded electronic or paper-based communication. The service requires extra steps for each e-mail user to take advantage of the service. First, a user account needs to be setup for each individual. Next, address books need to be updated and assigned alternative e-mail ID values. Also, users need to provide alternative e-mail addresses to route mail through this service. However, problems arise. External-oriented service is impractical for confidential communication correspondence. Replies and "cc" messages need to be re-addressed. There is no enforced standardization between individual users within a corporation. Also, corporations are unlikely to use a public service for managing e-mail traffic in this manner.

Another tool for coping with e-mail formatting problems may be to use Adobe's Portable Document Format ("PDF"), which is a powerful format that transmits a document and guarantees that the recipient will be able to read and view the information exactly the way the sender intended. However, PDF creation is a two-step process and is not integrated inline with the message in many popular e-mail applications. PDF's are effective for one-way communication but does not lend itself well for reply situations where individuals respond to a sender's text. It is also time-consuming to create a PDF for every electronic mail message. Furthermore, the attachment form of the e-mail often requires an extra step to read the message, making the process more difficult for the recipient.

A common occurrence in today's corporation is a hybrid of multiple mail systems encompassing Microsoft Exchange, Lotus Domino, sendMail, and other mail server applications arising from separate divisions, mergers and acquisitions, or foreign divisions. It would be desirable for all users to improve a company's brand image through their frequent e-mail communication.

Other types of services provide custom formatting. Web-based electronic greeting card services have been in existence for a number of years. They are a method of formatting electronic text submitted through a web-form or e-mail message. However, electronic greeting cards are extremely limited in their formatting capabilities and extend themselves to a limited amount of text. They do not address e-mail specific attributes including level of importance, reply-text, forwarded text, support for attachments, or customized templates. Additionally, greeting card systems are proprietary and are not designed to work within a high volume e-mail environment.

Individuals use re-mailers to send a message to others where they don't want to be recognized as the sender. These message services do change the e-mail contents by changing the sender and related header information. However, they don't change the content of a message, leaving the look and format of the message identical. These services don't meet the needs of corporate communications.

E-mail marketing has become a significant way to reach targeted, or sometimes untargeted, customers to communicate new information. Newsletters, coupons, press releases, sale promotions, and other timely information are communicated through HTML or text-based messaging to the recipient's e-mail account. This is typically through use of a database-driven e-mail application.

Database driven e-mail messages provide a single tool to communicate with a large audience in a mail-merge type of format. Individual messages or personal communication is not facilitated through these applications. The database-driven e-mail messages often use web-pages with minor personal touches (i.e. name substitution) for communication.

Personal e-mail communication differs and is often used for customer service inquiries, interaction with partners, and one-to-one communication with investors or board members.

While e-mail servers have traditionally focused on IT management and administration tasks, there are no tools currently available that help corporate communication managers control and centrally update the stationery and formatting for all e-mail in the corporate enterprise. That is, IT departments do not currently have the capability to customize personal e-mail communication and to create, update, and manage automatic formatting capabilities.

What is needed is a system and method for automatically incorporating corporate templates in electronic mail, a central tool for corporate communications to dynamically manage and create new e-mail templates, deploy to all e-mail users, and customize the individual template to the sender, recipient, time sent, or workgroup designation. Users should not be burdened with understanding the technology, remembering to add a template to a message, or reformatting a reply manually. The process should be seamless to the user and native in the e-mail environment to which the user is accustomed.

SUMMARY OF THE INVENTION

The concepts disclosed herein alleviate the above noted problems by providing an automated e-mail formatting system and method for formatting an e-mail in accordance with identified e-mail attributes.

The concepts address a system, method, and computer product by which an e-mail is automatically formatted. An e-mail is sent by an e-mail composer and received by a gateway server for processing outbound e-mail or inbound e-mail, which may include a SMTP server, POP3/IMAP server, or another server in communication with the SMTP or POP3/IMAP server. The server receives the e-mail message from the e-mail composer and text-parses the received e-mail for identifying an e-mail attribute. Next, the system formats the received e-mail message in accordance with a predetermined format corresponding to the identified e-mail attribute, which is sent to intended recipient(s).

More specifically, a e-mail formatter identifies e-mail attributes by text-parsing the e-mail sent from at least one client station for composing and/or receiving e-mail. A template manager assigns predetermined formats associated with the identified e-mail attribute. A message assembler assembles the e-mail in accordance with a specific format designated by an assigned predetermined format.

E-mail attributes may be extracted from the header which include any one of sender, sent date, author(s), recipient information, priority information, language, and country of origin, or e-mail attributes may be extracted from the body which may include keywords. Associated predetermined formats include any one of a graphic, background image, sound file, video file, hypertext, user information, company information, and digital signature, each associated with at least one e-mail attribute.

The system may identify other attributes such as e-mail portions of the e-mail related to any one of a new message portion, a reply portion, or a forwarded portion, and separately format the e-mail portion(s).

Additional objects, advantages, and novel features of the embodiments will be set forth in part in the description which follows, and in part will become apparent to those skilled in the art upon examination of the following and the accompanying drawings or may be learned by practice of the invention.

BRIEF DESCRIPTION OF THE DRAWINGS

The drawing figure(s) depict preferred embodiments by way of example, not by way of limitation. In the figures, like reference numerals refer to the same or similar elements.

DESCRIPTION

The present invention is a system, method, and program product for automatically managing and sending branded electronic mail ("e-mail") in an e-mail server environment, separate from a user's e-mail station or program.

Figure 1:
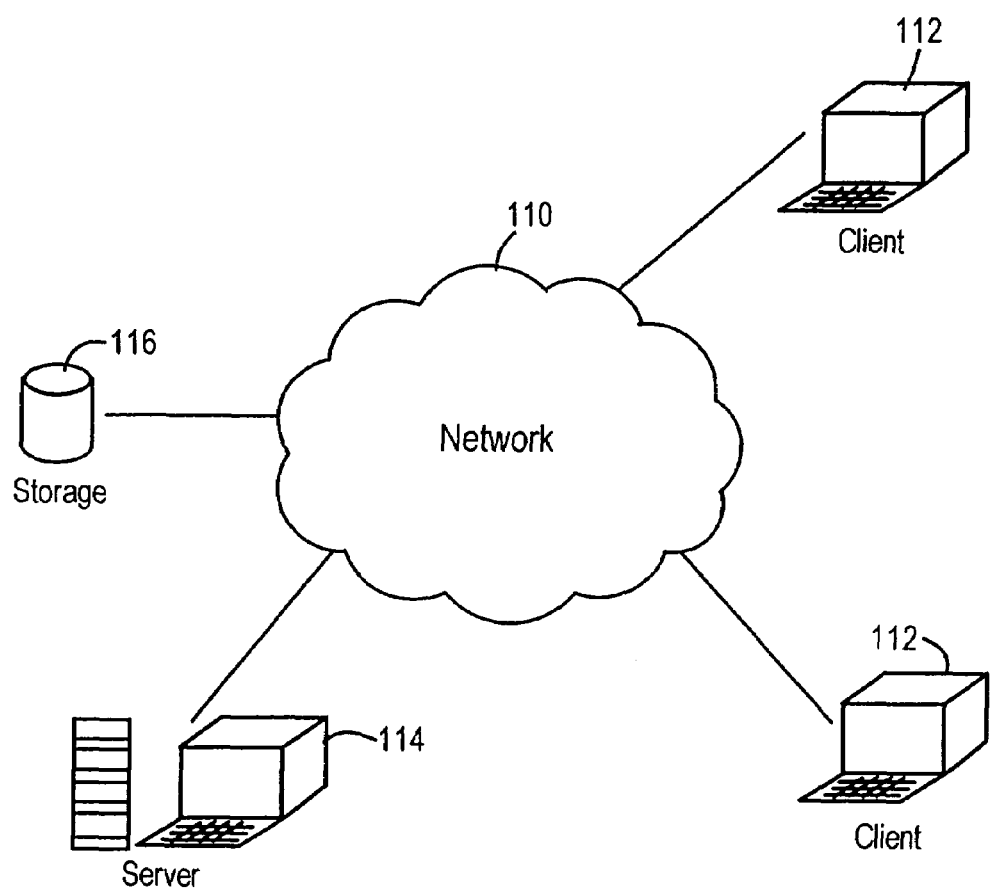
FIG. 1 illustrates a data processing system.
Figure 2:
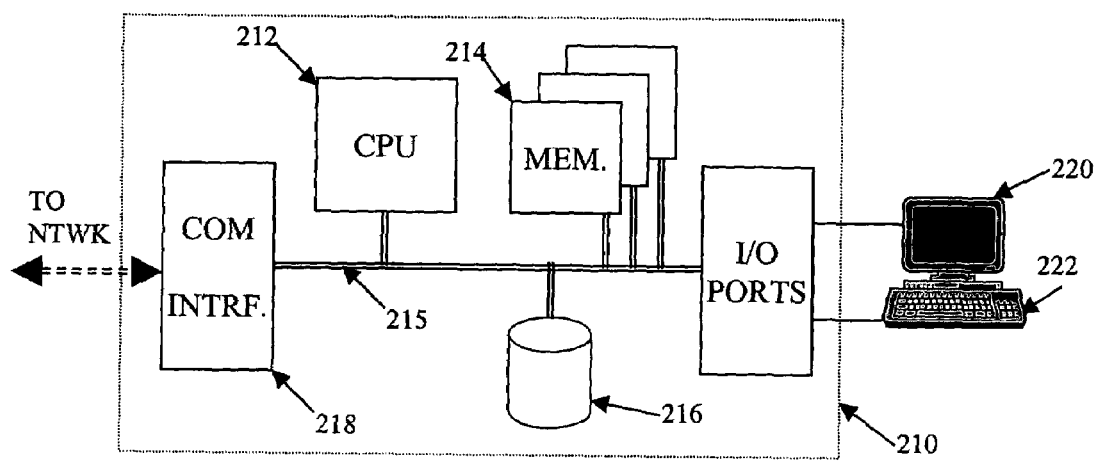
FIG. 2 illustrates a functional block diagram of a PC or workstation or server.

FIG. 1 illustrates a high-level representation of a network that may implement this disclosure. Generally, a network 110 is a communication infrastructure allowing various components connected to the network to communicate with one another. These components include a plurality of clients 112, a server 114, storage devices 116, and the like. The network 110 represents any type of network or more than one network that use common protocols to communicate with one another. The network 110 may be an intranet, a local area network, a wide area network, etc. The client 112 may be a computer or workstation hosting client specific applications. The server 114 or servers 114 may be any type of server facilitating communication between the plurality of clients 112, other devices connected to the network (e.g., a printer (not shown)), and devices external to the network. The storage device 116 may be a database external from the server 114 and accessible by the server 114, clients 112, or both FIG. 2 is a functional block diagram of a computer system 210 such as a PC or workstation type general purpose computer which may embody the client 112. The computer system 210 may embody the server 114. In general, FIG. 2 illustrates a computer system 210 that may be used in the client role, or as a server. Thus, the computer system 210 may be used for employing a client's electronic mail program, or may be used to employ e-mail associated programs or protocols on the server described further herein.

The exemplary computer system 210 contains a central processing unit (CPU) 212, memories 214, and an interconnect bus 215. The CPU 212 may contain a single microprocessor, or may contain a plurality of microprocessors for configuring the computer system 210 as a multi-processor system. The memories 214 include a main memory, a read only memory, and mass storage devices such as various disk drives, tape drives, etc. The main memory 214 typically includes dynamic random access memory (DRAM) and high-speed cache memory. In operation, the main memory 214 stores at least portions of instructions and data for execution by the CPU.

The mass storage 216 may include one or more magnetic disk or tape drives or optical disk drives, for storing data and instructions for use by CPU. For a workstation PC, for example, at least one mass storage 216 system in the form of a disk drive or tape drive, stores the operating system and application software as well as the client e-mail program. The mass storage 216 within the computer system 210 may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces 218 for communications, shown by way of example as an interface for data communications via the network 110. The interface 218 may be a modem, an Ethernet card or any other appropriate data communications device. The physical communication links may be optical, wired, or wireless.

The computer system 210 may further include appropriate input/output ports for interconnection with a display 220 and a keyboard 222 serving as the respective user interface. For example, the computer may include a graphics subsystem to drive the output display. The output display may include a cathode ray tube (CRT) display or liquid crystal display (LCD). Although not shown, the PC type system typically would include a port for connection to a printer. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The system is shown and discussed as an example only of a platform supporting several of the above-discussed processing and control functions. Those skilled in the art will appreciate that the computer system 210 may vary depending on specific implementations.

Figure 3A:
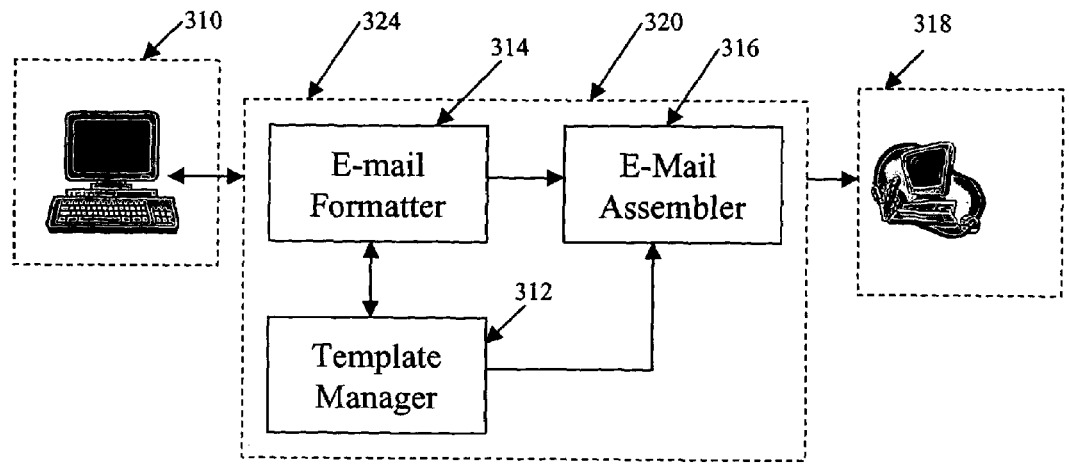
FIG. 3A illustrates a functional block diagram of a system for formatting outbound e-mail.
Figure 3B:
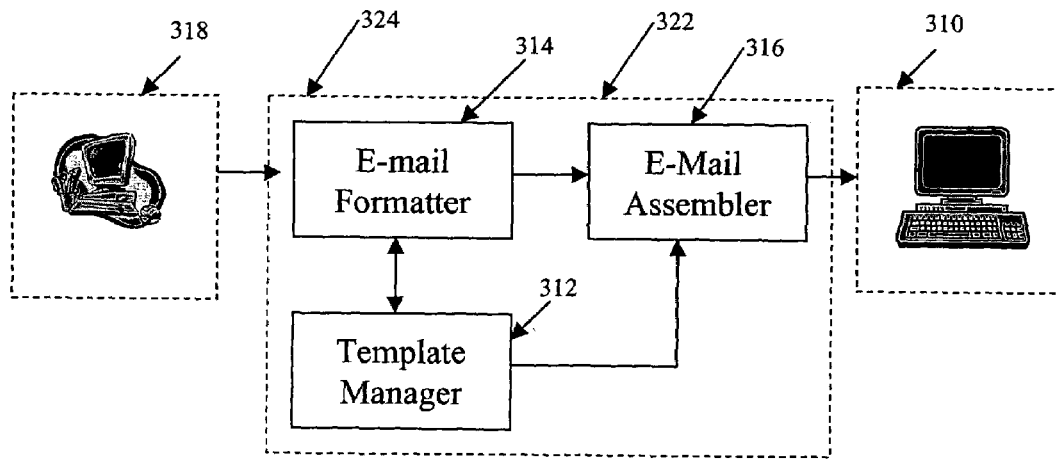
FIG. 3B illustrates a functional block diagram of a system for formatting inbound e-mail.
Figure 4:
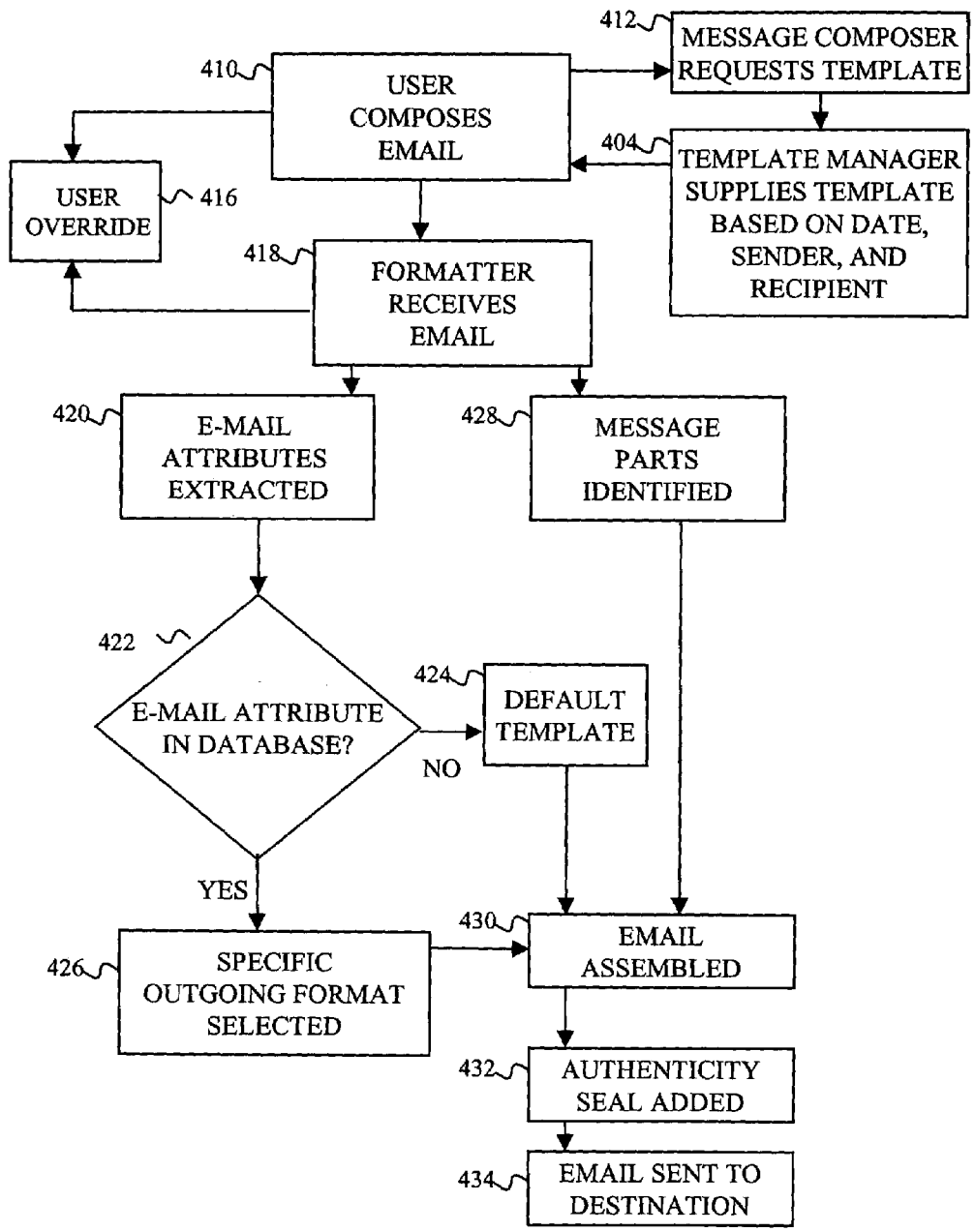
FIG. 4 illustrates a flow chart by which an e-mail is automatically formatted.

FIGS. 3A and 3B is a general block diagram illustrating a system for automatically formatting an outbound e-mail and a system for automatically formatting inbound e-mail, respectively. FIG. 4 is a flow chart diagram of a method for automatically formatting e-mail. The components discussed herein may be implemented by a computer system 210 or on a network 110, discussed above. Implementation of the apparatus and method disclosed herein is well within ordinary skill in the art.

The e-mail formatter 314 for processing inbound mail may be useful for commerce, travel, shipping, and financial information that is transmitted and sent to recipient(s). As many e-mails are formatted differently, finding identical information in various e-mail is difficult. XML-based documents will allow a vendor to highlight and indicate standard information so that it is more useful to their customers.

For example, by using a standard e-mail format, which may be managed by the information team or administrator, the mail formatter can automatically create specialized documents which, for example, formats an itinerary or car rental receipt in a systematic method that becomes easy to understand for each recipient. These standard formats may enable employees of a corporation to become more efficient. Data analysts can also use the e-mail formatter 314 to aggregate the new standardized information into an analytical tool for negotiating contracts in e-commerce situations. Validating XML documents and using them to trigger other management tasks could be an additional benefit. That is, an e-mail could trigger a separate system to review inbound mail of a certain format for monitoring and managing various attributes, such as common flight itineraries.

For inbound mail purposes, the template library becomes a set of XML-based style sheets that contains specific information on how to format documents to their appropriate type. This can include among others, travel documents, e-commerce purchases, proposals, financial projections, sales figures, or market research results. Each e-mail message would be designated (either within the message or as an attachment) by a key word indicating the XML standard that it is using. XML has a different variant based on each industry and by utilizing this data, the appropriate style sheet can be applied.

The mail formatter for processing outbound mail may be useful for automatically customizing e-mail by the sender, the author, recipient, time sent, workgroup designation, or keywords within the e-mail body, discussed further below.

The message composer 310 represents a computer system 210 employing an e-mail program allowing a user to create and receive e-mail, as in step 410. The brand of the e-mail software is not important as the system can support and be updated to support existing and new e-mail software programs. Any of various e-mail software programs can be used, including, for example, Microsoft Outlook and Eudora.

The e-mail formatter 314 may reside on the gateway server 320 for processing outbound e-mail, as in FIG. 3A. That is, the formatter 314 may reside on a server that is responsible for relaying messages from multiple e-mail clients toward the final destination(s). For security and performance reasons, many organizations have a separate machine to send all outgoing mail traffic. Depending on the e-mail server environment, the e-mail formatter 314 can be employed on a different system, but would be integrated tightly with the post-office properties of the mail server to format outgoing messages.

In FIG. 3B, the e-mail formatter 314 may reside on the gateway server 322 for processing inbound e-mail. That is, the e-mail formatter 314 may reside on a server for receiving inbound mail from multiple e-mail clients and relaying the received e-mail towards the final destination(s). Due to commonalties between FIGS. 3A and 3B and for ease of explanation, the outbound gateway server 320 and inbound gateway server 322 will be generally referred to as a central server 324. Also, the central server represents a single server or multiple servers.

The template manager 312 is in communication with the e-mail formatter 314, and stores predetermined format or template information which may be an HTML file. An HTML file is the standard for World Wide Web-page mark-up, but various other formatting and mark-up languages known to those skilled in the art can be used, such as XML or SGML. Template information can include graphic, sound, or video files. Template information may include font information or "mail-merge" effects such as sender's signature, title, or other components looked up from a database. It is possible to create the system without any one or several of these features.

Though FIGS. 3A and 3B illustrate the template manager based on the central server 324, templates may be stored on the client station 310 or in another server or database separate from the central server 324. If stored locally, either on a schedule or by manual action by the administrator, new template information may be sent to the message composer 310 from the template manager 312. E-mails in the client station 310 can be composed in the stationery format if the e-mail client has that capability.

The e-mail formatter 314 identifies e-mail attributes in an e-mail and the template manager 312 assigns at least one predetermined format according to e-mail attributes. Digital signature as well as encryption schemes may be assigned to the e-mail by the e-mail formatter 314. The e-mail assembler 316 receives the e-mail and formats the e-mail in accordance with templates assigned by the template manager 312. The resulting newly formatted e-mail is sent to intended recipient(s)

FIG. 4 is a flow chart diagram of a method for automatically formatting e-mail. After composing an e-mail 410, a user may preview the intended e-mail format by prompting the message composer 314 to contact the template manager 312 to request a template or predetermined format according to certain e-mail attributes, as in step 412. Alternatively, a preview may be generated before creation for viewing a default template, or may be generated during creation of the e-mail to ensure proper formatting for the recipient. In step 414, the template manager 312 sends at least one template from a template library to the message composer 310, and the message composer 310 generates a message preview showing the message as it will look to the recipient. Also, the e-mail assembler 316 may be configured to perform this step. The message composer 310 may not employ a preview function thereby eliminating steps 412 and 414. This would be appropriate for message composers 310 that do not support preview displays, such as Blackberry initiated messages, text UNIX mail programs, or any other system with limited capabilities. In this case the user will not see a preview, though the mail will be formatted on delivery with the appropriate template.

Also, template information need not be sent with the message from the message composer 310 to the e-mail formatter 314 in the system. However, formatting the message for sending can be performed by the message composer 310, or in the preferred embodiment, on the central server 324.

In step 416, a user may override the automatic formatting and force a specific template to be applied. This may be useful for an administrator to send a test message. This function may be available to certain users or system wide. As many e-mail users use company e-mail for personal use, a company may require that each user override the automatic formatting capabilities when using e-mail for personal use. This will avoid unnecessary population of recipient information in company databases, and will not burden the central server 324 with unnecessary formatting.

In step 418, the e-mail formatter 314 receives e-mail messages from the message composer 310 through a previously specified mail port. The e-mail formatter 314 can read messages in plain text or in text formatted in numerous systems, such as rich text format (RTF), hypertext mark-up language (HTML), or extensible mark-up language (XML). Other formatting systems may be used. The e-mail formatter 314 shall not be limited to the formats specified herein.

Upon receiving 418 an e-mail from the message composer 310, in step 420, the e-mail formatter 314 extracts e-mail attributes from the e-mail using a header extractor by text-parsing according to the standards for e-mail messages. If the message is an internet protocol message, than standard IETF rules may apply. However, this system would also be useful with other messaging systems, including X.400 addressing among others. Sender, date, author, recipient information, priority information, language, and country of origin may be extracted.

Also, in step 420, the e-mail formatter 314 may identify other e-mail attributes in the body of the e-mail such as specific keywords. For example, the e-mail formatter 314 may extracts keywords such as privileged, confidential, proprietary, or a keyword related to a company product. An administrator will be able to choose whether recipient-based, sender-based, date-based, or specific keywords approach is the primary determinant for formatting an e-mail message.

Extracted e-mail attributes are sent to the template manager 312 to determine a template(s) to be applied to the individual message 422. Frequently used templates may be cached for quick performance and deployment when high throughput is needed. If the identified attributes do not have a corresponding template, a default template may be assigned 424. However, if corresponding e-mail attributes are identified, a template or more than one template is assigned 426 to the e-mail. In any event, a procedure call is sent to the e-mail assembler 316 designating template selection(s).

Certain companies, or DNS domains, or individuals may necessitate a different or customized template for e-mail communication. Some e-mail programs are able to display information that other e-mail programs cannot. Programs such as Eudora, Netscape, and Outlook, which can display HTML files and graphics will need a different template than UNIX text-based e-mail clients, such as Pine. Later versions of graphic-based programs typically offer greater display capabilities than earlier versions. Clients that do not support JavaScript or background graphics should receive a template version that does not have these problematic HTML tags embedded in the message. Specific templates may be used depending on e-mail client(s). Also, message assembly may differ per the destined e-mail client(s).

Thus, in a parallel step, message content or body of the e-mail, most commonly in text, HTML, or dual-mode (alt/related or alt/alternative formats), may be extracted 428. The message extractor determines the sender's e-mail client to properly identify the new message portion, reply portion, and/or forwarded message portions of the e-mail message. Other ways to identify message portions are known to those of ordinary skill in the art. The e-mail client is identified through the "X-mailer" or similar field. Separating the individual message components is necessary to properly format outbound or inbound mail to reflect the branded identity of various authors. It is likely that corporations and users would like their message highlighted and branded in a different way than reply text or forwarded message content. Upon identifying e-mail portions, a procedure call is sent to the e-mail assembler 316 at step 430 that designates the separated e-mail portions.

The e-mail assembler 316 receives procedure calls from the e-mail formatter 314, the template manager 312, or both. The procedure calls instructs the e-mail assembler 316 the manner in which the e-mail is automatically formatted. Optionally, in the assembly process, an authenticity seal may be attached to the outgoing e-mail 432. Many digital signature techniques exist and can be used. A graphically created bar-code, encoded with user-specific information may be used. The e-mail formatter 314 can optionally store public keys of all signed incoming e-mail to build a corporate directory of recipients and facilitate encrypted e-mail for future transmissions. In addition, private keys from corporate mail server users can be stored to ensure that every outgoing e-mail will be digitally signed to recipients who support receiving authenticated e-mail.

The assembled message will then be sent to its destination via standard message protocol specifications. Depending on application settings, a copy may be retained.

Figure 5:
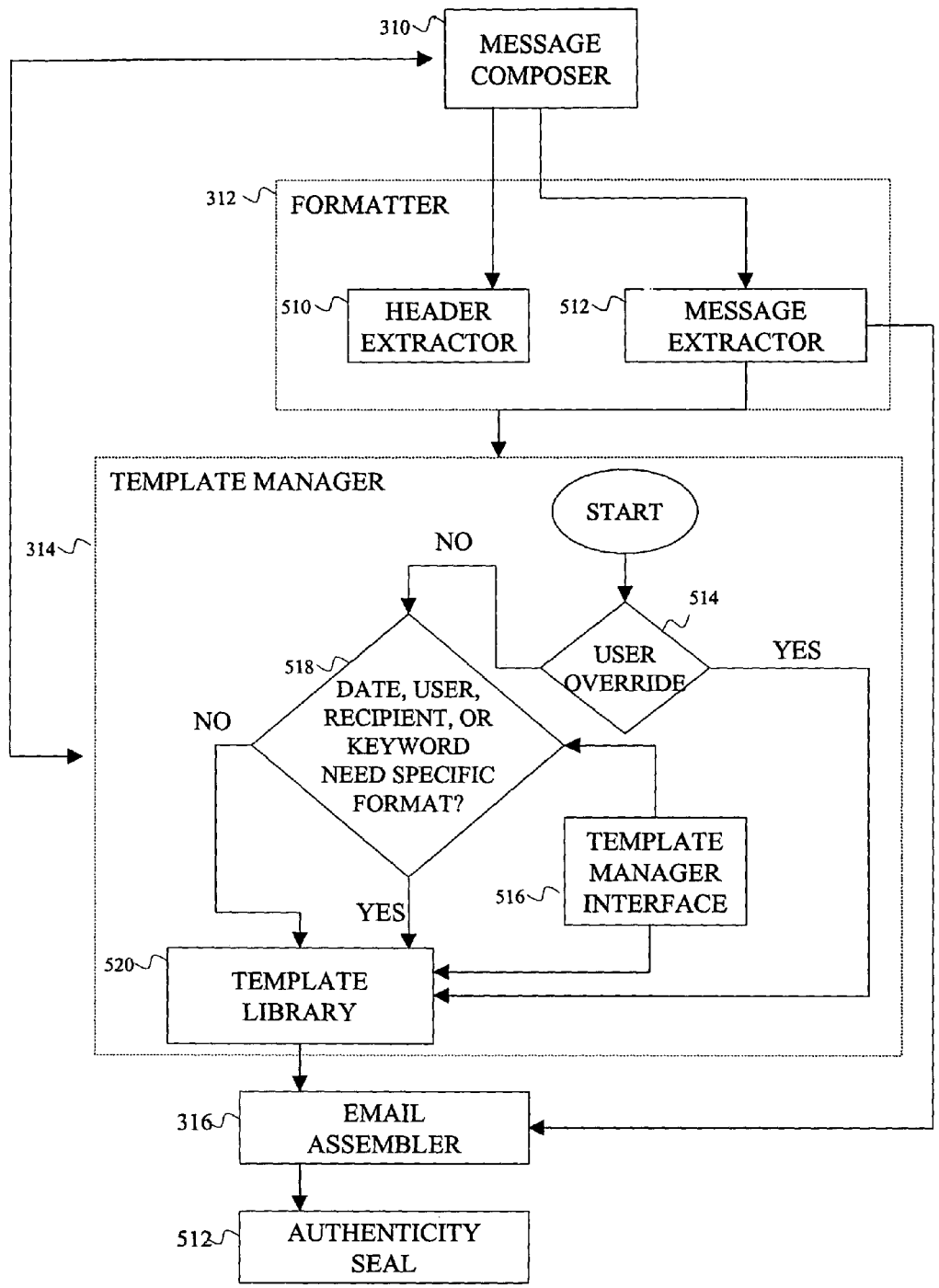
FIG. 5 illustrates a system for automatically formatting e-mail.

FIG. 5 illustrates the system for automatically formatting mail, as in FIG. 3, but in greater detail. The e-mail formatter 314 includes a header extractor 510 and a message extractor 512. As previously discussed, the header extractor 510 extracts header information from an e-mail and identifies the date the e-mail was sent, the sender, the author, the recipient (s), priority information, language, and country of origin in the header. Extracted header attributes are sent to the template manager 314. Also, the message extractor identifies message portion(s), and may identify keywords, i.e., e-mail body attributes in at least the new message portion. Identified e-mail body attributes are sent to the template manger 314 and e-mail assembler 316.

The template manager 314 allows a company to centrally manage templates for all e-mail users within the company. The template manager 314 is made up of three primary sub components, the template library 520, the template manager 516, and template assignment tool 518. The template manager 314 is a user-application to interact with the template assignment tool 518 and the template library 520, preferably using a computer system 210.

At the start, the template manager 314 checks for a user override, as in step 416. In the event of a user override, the template manager 314 may assign a standard template or apply a template manually selected by the user.

The template library 520 also stores templates best used with each e-mail client. E-mail client information can be initially populated through e-mail archives through a batch import process. Since a large percentage of e-mail correspondence is repeat e-mail, many existing e-mails will be immediately optimized for each recipient.

The system can also be used to translate incoming or outbound e-mail from one system to another. If a message comes in from a user of Outlook intended for a user of Eudora, the message can be optimized for viewing in Eudora before sending it to the recipient.

An administrator may add new templates and designs to the template library 520. In this way, marketing professionals, graphic artists can control the quality, content, and identity of mails sent centrally while using their expertise in graphic communication to benefit the enterprise. Individuals can focus on personal content without changing their e-mail habits for brand identity purposes.

The template library 520 has a built-in import allowing an administrator to manage the look of outbound and even inbound e-mail. When uploading an HTML file to the library, the template manager 314 may parse for any "e-mail-specific problems" which some markup tags can cause. This will ensure compatibility across a wide variety of e-mail clients. In addition, linked files including placed graphics, background graphics, sound, video files, digital signatures are all uploaded into the library. The font face, color, and size can also be specified at this step inherent in the HTML file. The template library 520 also provides basic building blocks that can be inserted as modules into templates.

The template assignment tool 518 selects the template or templates from the template library 520 to be used. The decision of which template to use depends on detected e-mail attributes, such as the date, the sender, the author, the sender's group, the recipient, keywords, and such other factors as are introduced by the administrator. The administrator will be able to choose whether recipient-based, sender-based, date-based, or specific keywords approach is the primary determinant in prioritizing a template via the template manager 516.

Specific dates or date ranges are assigned to individual templates or assignment entries to facilitate dynamic messaging. Seasonal or promotional templates can be utilized and assigned active dates, enabling marketing to plan campaigns and use electronic messaging as a new medium in presenting targeted messages. Thus, administrators can assign templates that are used during particular time periods.

Individuals can also be listed in the assignment tool 518, and the priority will be assigned from smallest unit to largest. For example, individuals can be assigned their own template, including their own names, phone numbers, fax numbers, e-mail addresses, postal addresses, job titles, or other personal information added, according to the design of the template.

Individual information and other information may be obtained from an enterprise directory services component (LDAP, Active Directory, or similar). Integration with directory services prevents the need for maintaining separate directory and updating different entries for employee turnover or restructuring. Small businesses that do not use directory services can use the template manager 516 as an independent database.

Individual recipients or classes of recipients may be sent e-mail with particular templates. For example, e-mail to internal recipients (employees of the same organization as the sender) can be sent e-mail with advertising about company policies or goals, while e-mail to external recipients might have advertising about company products. Different templates might be used for e-mail to competitors than for e-mail to customers. E-mail from a staff member to upper management or from upper management to the board of directors might need a different template than e-mail complaining to a vender with a routine order for supplies or a complaint about late delivery. Information about recipients is stored in the template manager database or an enterprise directory service.

If an individual is not listed, the group the individual belongs may result in the assigned template. If no groups are found, it reverts to the default template in the system. A priority field may be available in situations where users are members of multiple groups. This technology is implemented in a manner similar to ACL or permission-based applications.

Also, if an e-mail attribute is not listed in the library, a default lowest-common-denominator version of the template is selected and sent (in text and HTML mode) using a minimal HTML tag set for readability across a wide variety of e-mail clients. Optionally, a read-receipt is attached by the e-mail assembler to the outgoing e-mail. The read-receipt is preaddressed to the e-mail recipient database to update its records.

Members of different groups can have different templates. Such groups may include Sales, Manufacturing, Finance, Human Resources, Information Technology, Design, Regional offices, Upper Management, or Board of Directors. Each group template could be modified by the sender's personal information. Information about groups is synchronized with a directory service and stored in the template manager database.

The outgoing e-mail is assembled in the e-mail assembler 524 from the template combined with individual message components, including the outgoing message and any identified reply and forward portions. Custom markup tags indicate where components are to be inserted and text parsing steps apply the associated font or other visual attributes resulting in a single HTML file—effectively a new message.

Supporting media files including but not limited to graphics, sound, and/or video may be attached to the message. Supporting files may also be linked over the network as well through a company's web site or other publicly accessible computer.

Following the assembly of the HTML mail message, an alternative text form may be generated to be read by users who do not have graphical or HTML-enabled mail clients. This includes popular UNIX-based mail clients as well as wireless devices such as BlackBerry devices and wireless phone messaging. This alternative message will also be included in the message delivery.

Message headers may need to be modified depending on the chosen template. For example, a text message with graphic files included in the template may need to be re-cast as a multi-part message. This header transformation will be seamless to the user and handled automatically by the format server.

A useful feature of the disclosure is that the e-mail the recipient views is itself formatted, and the formatted message does not have to be attached separately to the text e-mail, such as with sending PDF or PowerPoint files. Creating such attachments is extra work for the user, and viewing them is extra work for the recipient, who must also have the appropriate viewing program.

Security is an important part of this technology. Enterprise security systems known to those skilled in the art would be used in this solution, including encryption, port security, and operating system security. The ability to receive e-mail to use the message format server 314 can be verified through reverse-IP, firewalls, or similar means well known to those skilled in the art.

Security for the template manager application is configurable for a network atmosphere. The format server will host the application and make it available over the network through a specified port. Enterprise administrators can restrict accessibility to this port or permit only local access (utilizing physical security) through existing operating system and network management utilities.

Figure 6:
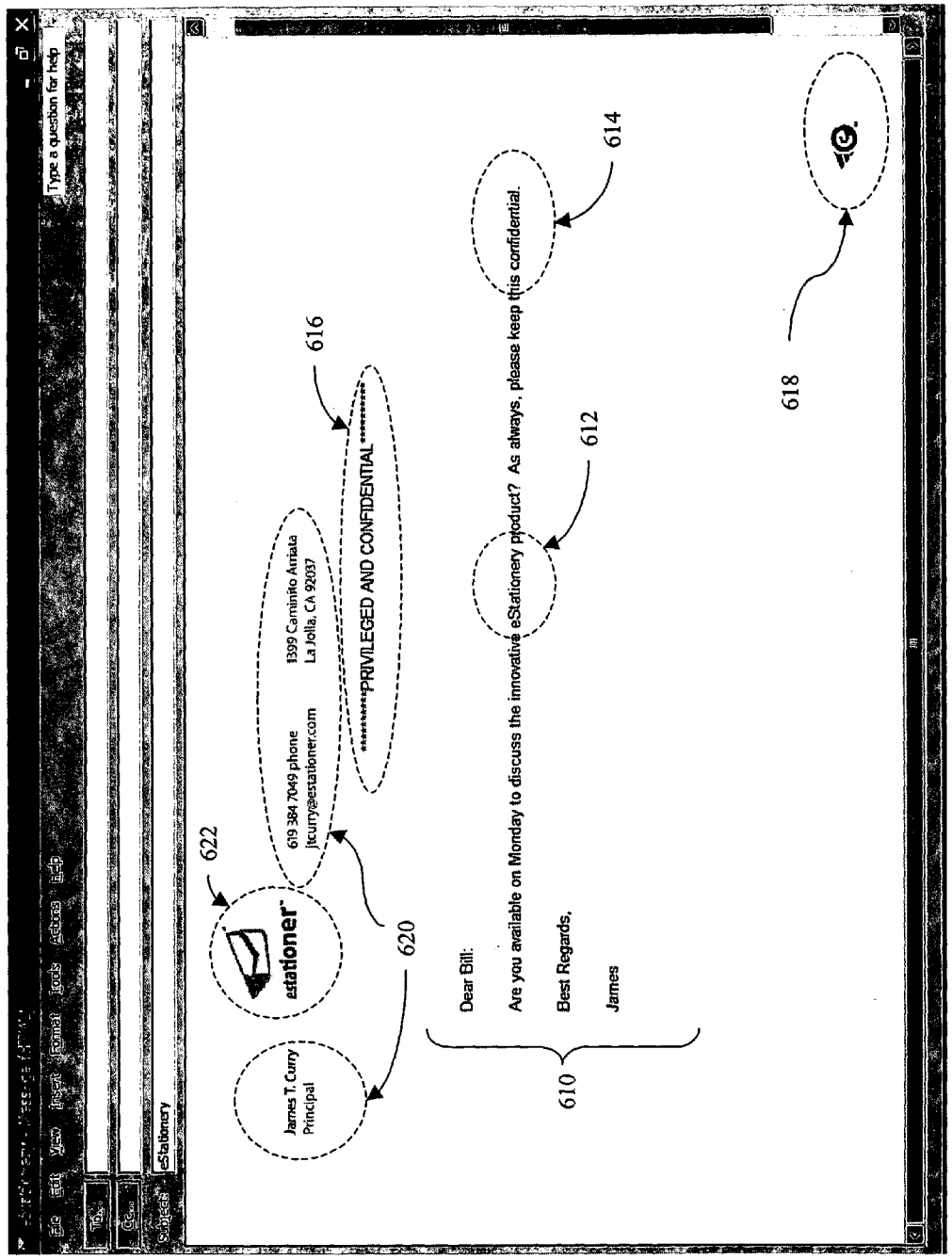
FIG. 6 illustrated an example of an automatically formatted e-mail.

FIG. 6 illustrates of an e-mail automatically formatted using the disclosed system and method. The e-mail body is designated by reference 610. In this example, the message extractor 512 identified two keywords, "eStationer" 612 and "confidential" 614 As a result, the template manager 314 assigned two templates. First, the template manager 314 assigned a "PRIVELEGED AND CONFIDENTIAL" template 616 to be applied above the body 610 of the e-mail. Second, the template manager 314 assigned a graphic 618 linking the recipient of the e-mail to product information on the eStationer product. Though not shown, the header extractor 510 identified the sender and assigned a template 620 designating the sender's name, title, address, and phone numbers. Also, the template manager included another template identifying the sender's company logo, which may commonly be associate with a default template.

Other unique aspects relate to unique software or program products, for implementing the automatic formatting system. A software or program product includes information, which may be carried by at least one machine-readable medium. The information carried by the medium may be executable code, one or more databases and/or information regarding management print streams. In disclosed embodiments, the information comprises executable code for causing one or more programmable computer systems to implement automatic formatting of e-mails.

A computer readable medium, as used herein, may be any physical element or carrier wave, which can bear instructions or code for performing a sequence of steps in a machine-readable form or associated data. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scanable format. A carrier wave type of medium is any type of signal that may carry digital information representative of the data or the instructions or code for performing the sequence of steps. Such a carrier wave may be received via a wire-line or fiber-optic network, via a modem, or as a radio-frequency or infrared signal, or any other type of signal which a computer or the like may receive and decode.

Terms relating to computer or machine "readable medium" as used herein refer to any medium that participates in providing instructions to a processor for execution or for carrying data to or from a processor for storage or manipulation. Such a medium may take many forms, including but not limited to, non-volatile media, volatile media, and transmission media. Non-volatile media include, for example, optical or magnetic disks. Volatile media include dynamic memory, such as main memory. Transmission media include coaxial cables; copper wire and fiber optics, including the wires that comprise a bus within a computer system. Transmission media can also take the form of electric or electromagnetic signals, or acoustic or light waves such as those generated during radio frequency (RF) and infrared (IR) data communications. Common forms of computer or machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, or any other medium from which a computer can read. Various forms of computer or machine readable media may be involved in carrying one or more sequences of one or more instructions or data to a processor for execution.

Other uses for the method, system, and program product may be developed. For example, the data obtained from inbound and outbound messages may be useful for a corporation. The data may be analyzed to determine the types of messages sent and received, which will allow a company to create specialized e-mail formats, identify special target audiences, etc. Generally, this tool can be combined with analytic and market intelligence software systems to "data-mine" a corporate e-mail infrastructure.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein.

What is claimed is:

1. A method for formatting electronic mail sent from an e-mail composer and received by a server for receiving and processing inbound e-mail or a server for receiving and processing outbound e-mail, comprising the steps of:
   receiving from the e-mail composer an e-mail message that is addressed to at least an intended recipient other than a sender of the e-mail message;
   text-parsing the received e-mail for identifying an e-mail attribute;
   formatting the received e-mail message in accordance with a predetermined format corresponding to the identified e-mail attribute; and
   sending the formatted e-mail message to the intended recipient.

2. The method for formatting electronic mail according to claim 1, wherein the step of identifying the e-mail attribute comprises the step of identifying the e-mail attribute from a header of the received e-mail.

3. The method for formatting electronic mail according to claim 2, wherein the e-mail attribute includes any one of sender, date, author, recipient information, priority information, language, and country of origin in the header.

4. The method for formatting electronic mail according to claim 1, wherein the step of identifying the e-mail attribute comprises the step of identifying e-mail attribute from a body of the received e-mail.

5. The method for formatting electronic mail according to claim 4, wherein the e-mail attribute includes a predetermined keyword in the body of the e-mail.

6. The method for formatting electronic mail according to claim 1, further comprising the step of associating a predetermined format in accordance with an identified e-mail attribute.

7. The method for formatting electronic mail according to claim 6, wherein the predetermined formats include any combination of a plurality of templates.

8. The method for formatting electronic mail according to claim 7, wherein the plurality of templates include any one of a graphic, background image, sound file, video file, hypertext, user information, company information, and digital signature.

9. The method for formatting electronic mail according to claim 6, wherein the step of associating the predetermined format includes accessing a library compiling predetermined formats and selecting the predetermined format in accordance with e-mail attribute.

10. The method for formatting electronic mail according to claim 1, further comprising the steps of extracting an e-mail portion from the e-mail corresponding to any one of a new message portion, a reply portion, and a forwarded portion.

11. The method for formatting electronic mail according to claim 10, further comprising formatting the extracted e-mail portion according to an e-mail attribute of the extracted e-mail portion.

12. The method for formatting electronic mail according to claim 11, further comprising determining an e-mail client associated with the e-mail portion.

13. The method for formatting electronic mail according to claim 1, further comprising forcing a predetermined format by user override.

14. An apparatus for automatically formatting electronic mail, comprising:
   a server configured to receive from a sender an e-mail message addressed to at least an intended recipient other than the sender and to send a formatted e-mail message to the intended recipient, the server including:
   an e-mail formatter for identifying an e-mail attribute by text-parsing the e-mail message addressed to the intended recipient;
   a template manager for assigning a predetermined format in accordance with the e-mail attribute; and
   a message assembler for assembling the formatted e-mail message to include at least original content of the e-mail message addressed to the intended recipient in accordance with a specific format designated by the assigned predetermined format.

15. The apparatus for automatically formatting electronic mail according to claim 14, wherein the e-mail formatter includes a header extractor for identifying any one of sender, sent date, recipient information, priority information, language, and country of origin in the header.

16. The apparatus for automatically formatting electronic mail according to claim 14, wherein the e-mail formatter includes a message extractor for identifying a keyword in the body of the e-mail.

17. The apparatus for automatically formatting electronic mail according to claim 14, wherein the e-mail formatter includes a message extractor for identifying an e-mail portion of the e-mail corresponding to any one of a new message portion, a reply portion, and a forwarded portion.

18. The apparatus for automatically formatting electronic mail according to claim 14, wherein the template manager includes a template manager interface, a template assigner, and a template library each in communication with one another.

19. The apparatus for automatically formatting electronic mail according to claim 18, wherein a database compiles the template library for storing a predetermined format.

20. The apparatus for automatically formatting electronic mail according to claim 19, wherein the predetermined format includes any one of a graphic, background image, sound file, video file, hypertext, user information, company information, digital signature each associated with at least one e-mail attribute.

21. The apparatus for automatically formatting electronic mail according to claim 14, wherein the server receives and processes inbound e-mail.

22. The apparatus for automatically formatting electronic mail according to claim 14, wherein the server receives and processes outbound e-mail.

23. The apparatus for automatically formatting electronic mail according to claim 14, wherein the server is a server integrated with post-office properties of a mail server.

24. A program product, comprising executable code stored in at least one machine readable medium, wherein execution of the code by at least one programmable computer causes the at least one programmable computer to perform a sequence of steps, comprising:
   text-parsing an e-mail addressed to at least an intended recipient other than a sender of the e-mail message and received from an e-mail composer for identifying an e-mail attribute in the header or body of the e-mail;

formatting the e-mail in accordance with a predetermined format corresponding to the identified e-mail attribute; and sending the formatted e-mail message to the intended recipient.

25. The program product according to claim 24, wherein the e-mail attribute in the header includes any one of sender, date, recipient information, priority information, language, and country of origin.

26. The program product according to claim 24, wherein the e-mail attribute in the body includes a predetermined keyword in the body of the e-mail.

27. The program product according to claim 24, further comprising the step of determining an e-mail portion of the e-mail corresponding to any one of a new message portion, a reply portion, and a forwarded portion.

28. The program product according to claim 24, further comprising the step of associating a predetermined format in accordance with the identified e-mail attribute.

29. The program product according to claim 28, wherein the predetermined format includes any combination of a plurality of templates.

30. The program product according to claim 24, wherein the plurality of templates include any one of a graphic, background image, sound file, video file, hypertext, user information, company information, and digital signature.

* * * * *